UNITED STATES PATENT OFFICE
PTO – BOYERS, PA DUTY STATION

---

PAGE NOT AVAILABLE

PATENT NUMBER X110 FOR THE ISSUE DATE 4/20/1996 HAS BEEN SCANNED/LOADED, BUT WITH MISSING PAGE(S). UPON RECEIPT OF THE MISSING PAGE(S), THE ENTIRE DOCUMENT WILL BE RESCANNED. THIS NOTICE IS FOR THE MISSING PAGE CONTAINING:

Missing ALL Drawings

DATA CONVERSION OPERATION
BOYERS, PA

110X april 20, 1796

Thomas Bedwell — Dated April 26. 1796.

The Schedule referred to in these Letters Patent
and making part of the same containing a description in the words
of the said Thomas Bedwell himself of an Improvement in the mode
of forming a yellow color. Specification of a yellow color invented by
Thomas Bedwell of the City of Philadelphia and State of Pennsylvania
intended for oil varnish or water painting — by combining the finer
coloring parts of vegetable substances with the oxides of lead. so as
to produce a beautiful permanent color the principles of which are
minutely described in the process herewith annexed Process. Take
one hundred weight of white lead free from any admixture of calca-
-rious earth (which should it be so adulterated must be extracted
by the means of weak vitriolic acid. to be added until no more
effervescence is observed, after which it must be well washed with
clean water until no remains of the acid is left) mix with this 10
pounds of english alum previously dissolved in warm water, when
the oxide of lead and the solution of alum are well incorporated,
add two ounces of tin dissolved in aqua Regia — stir the whole well
together, at least 10 or 12 times in the space of one hour, which
being expired, boil any of the yellow coloring barks, for instance, hick-
-ory, which is the best in clean water until the liquor assumes the
color of small beer — pour this off into a tub or settler having holes
all down its side at two inches distance from each other with pegs
filled therein Suffer this liquor to remain undisturbed for one hour
at the expiration of which let out as much by withdrawing the pegs
(beginning at the uppermost) as will run clear taking a particular care
to let none of the gross precipitated matter at the bottom to mix in
the running off — pour this upon the mixture of the lead as afore described
and let it be well stirred up, the coloring matter will now be found
to have united with the oxide and the water rises upon its surface
clear and nearly colorless, which must so soon as the color is duly
settled, be poured off and thrown away. — The process must be con-
-tinued so far as relates to the adding the bark liquor, which is con-
tinued so long until the color has attained its requisite strength. In

110X some instances (from a cause that is not thoroughly known perhaps from
a difference in manufacturing the oxide) the color refuses to form a due
combination. when this is found to be the case there must be added to
the back. in the boiling state 4 ounces of pure fixed alkaline salt to
a kettle containing 60 gallons. this will cause the coloring matter to
precipitate and the process goes on as before described, When the color
is finished it must be repeatedly washed with warm water to cleanse
it from the salts. it is then drained upon linen cloths. and dried in the
shade or stove room — The above is the general proportions in the mode
of composition. it however admits of change in the process, as by boiling
the alum in the back & [illegible] but upon trial none succeeded so well as
that above mentioned. This color is found to resist the action of
the air or weather. it requiring near a red heat to effect its decom-
-position, is preferable to the english patent yellow. which seldom
admits of more than one ounce of white lead to lower it to its usual
shade in painting. and is attended with an infinitude of trouble
in the grinding, being little less than an imperfect vitrification
Whereas the above mentioned color receives more than an equal
weight of white lead to reduce it to the same standard, and is
ground full as easy as any color now in use. In testimony
whereof I have hereunto set my hand and seal this 15th day of
February 1796.

Signed Sealed — Witness
Joseph Burr
John Mason

Thos Bedwell L.S.

Patent dated 20th April 1796 —
[illegible] & [illegible] [illegible] Sept 27, 18[illegible]